W. W. PARKER.
CUTTING DEVICE.
APPLICATION FILED APR. 11, 1916.
1,204,482.
Patented Nov. 14, 1916.
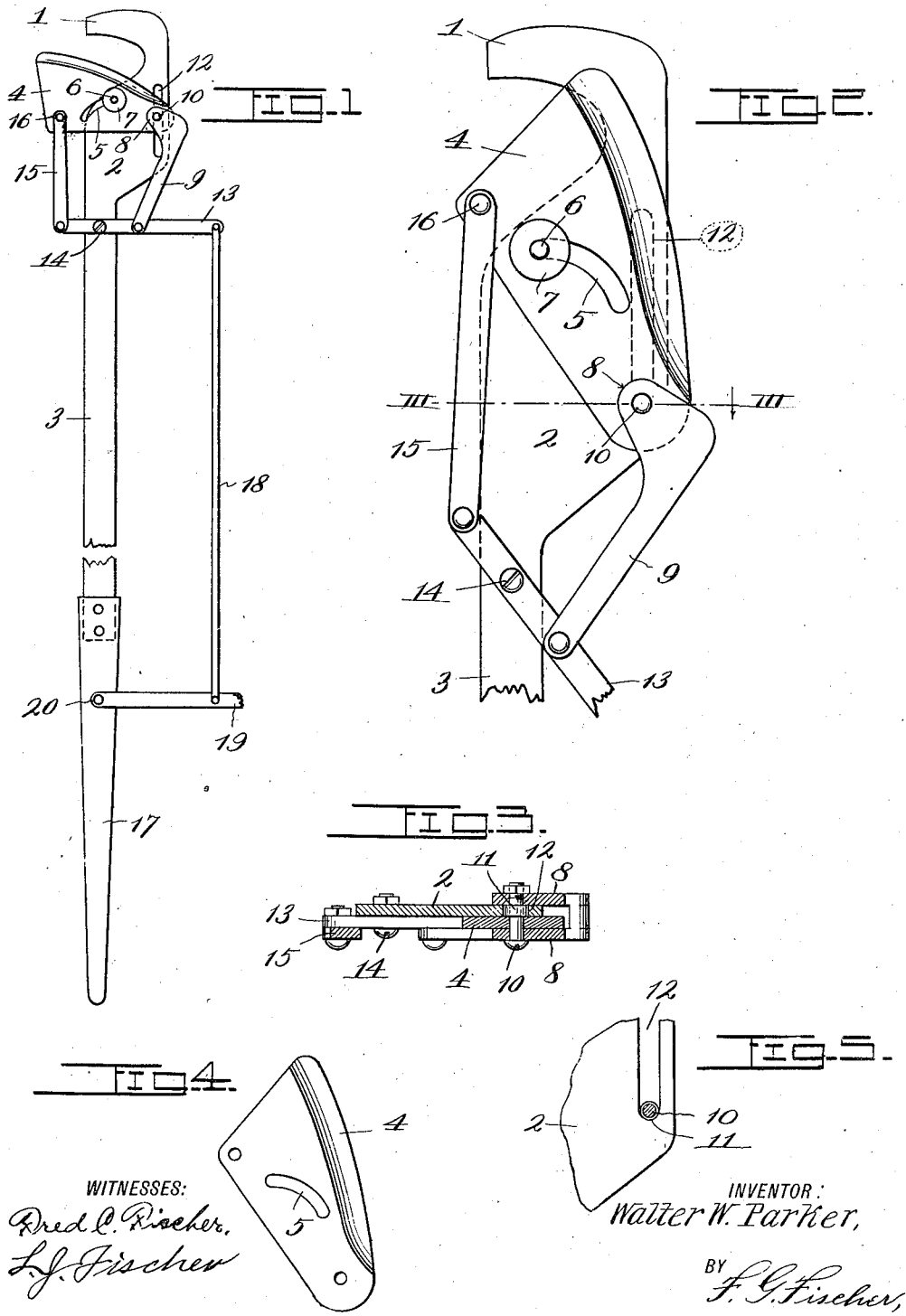
WITNESSES:
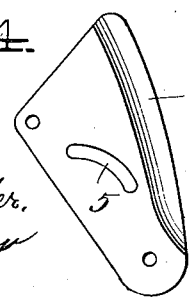
INVENTOR:
Walter W. Parker,
BY
F. G. Fischer,
ATTORNEY.

UNITED STATES PATENT OFFICE.

WALTER WINFRED PARKER, OF WICHITA, KANSAS.

CUTTING DEVICE.

1,204,482.  Specification of Letters Patent.  Patented Nov. 14, 1916.

Application filed April 11, 1916. Serial No. 90,303.

*To all whom it may concern:*

Be it known that I, WALTER W. PARKER, a citizen of the United States, residing at Wichita, in the county of Sedgwick and State of Kansas, have invented certain new and useful Improvements in Cutting Devices, of which the following is a specification.

My invention relates to cutting devices, and my object is to provide a new and useful device of this character which may be used to advantage in pruning trees, trimming hedges, dehorning cattle, cutting bolts, etc.

The invention embodies a stationary blade and a movable blade, and an important feature is the manner in which the movable blade is mounted and actuated, so that in operation it has a sliding cut and its power increases throughout its cutting stroke.

Other features of the invention will hereinafter appear, and in order that said invention may be fully understood, reference will now be made to the accompanying drawings, in which:

Figure 1 is a side elevation of a cutting device made in accordance with my invention. Fig. 2 is an enlarged broken side elevation of the upper portion of the cutting device with the movable blade in closed position. Fig. 3 is a cross section on line III—III of Fig. 2. Fig. 4 is a detail side elevation of the movable blade. Fig. 5 is a broken detail, partly in section, of a slotted shank and an antifriction roller employed in carrying out the invention.

In carrying out the invention, I employ a stationary blade 1, which is of hook-shape to engage limbs and other objects to hold them in position to be severed. Said blade 1 has a relatively wide shank terminating in a handle 3.

4 designates the movable blade which is provided with a curved slot 5 intermediate its ends to receive a fulcrum 6 upon which said blade 4 by reason of the slot 5 is permitted a compound movement, i. e., a sliding movement and a rocking movement. The blade 4 is prevented springing laterally from the blade 1 and the shank 2, by a washer 7 on the fulcrum 6 and the jaws 8 of a link 9. Said jaws 8 straddle the shank 2 and the heel of the blades 4 and are operably-connected thereto by a pivot 10, provided with an antifriction roller 11, arranged to traverse a longitudinal slot 12 in the shank 2 and coact with the fulcrum 6 and the sides of the slot 5 in guiding the blade 4 throughout its opening and closing movements.

13 designates a lever mounted intermediate its ends upon a fulcrum 14 projecting from the handle 3. The link 9 is pivotally-connected to the lever 13 at one side of the fulcrum 14, and a link 15 is pivotally-connected at one end to said lever 13 at the opposite side of the fulcrum 14. The opposite end of the link 15 is connected by a pivot 16 to the forward portion of the blade 4 or at the opposite side of the fulcrum 6 from that on which the pivot 10 is located. When trees are to be pruned an extension 17 is fixed to the handle 3 and a rod 18 is loosely connected to one end of the lever 13 and a handle 19, which latter is connected by a pivot 20 to the extension 17.

The operation is substantially as follows: Preparatory to severing a limb the blade 4 is swung to open position by raising the handle 19, and the cutting edge of the hook 1 is placed in engagement with said limb to hold the same during the severing operation. The handle 19 is then pulled downward to cause the link 15 to push upward and close the blade 4, which in severing the limb causes the link 19 to bear downward on the lever 13, with which it coacts in the manner of a compound lever. Instead of being pushed transversely through the limb by main force, the blade 4 makes a sliding cut requiring but a minimum amount of power and distributing the wear over a large surface of its cutting edge, so that the same will not become easily dulled. At the same time the closing power increases as the upper portion of the blade moves closer to the fulcrum 6 and thus reduces the resistance against the severing operation. The strain of actuating the blade 4 is distributed over the two links 9 and 15 and their pivots, so that the wear will be less than if but one link were employed. As the use of springs and other frail parts is dispensed with, it is obvious that the device, as a whole, is strong and durable in construction.

While I have shown and described the preferred construction of the several parts, it is to be understood that such changes in the construction, combination and arrangement of parts can be made as properly fall within the spirit and scope of the claim.

Having thus described my invention, what

I claim and desire to secure by Letters Patent, is:

In a cutting device of the character described, a hook-shaped stationary blade having a shank provided with a longitudinal slot and terminating in a handle, a fulcrum projecting from said shank, a movable blade having a curved slot through which said fulcrum extends and whereby said blade is permitted a compound movement, an anti-friction roller mounted on the movable blade and adapted to traverse the longitudinal slot in the shank, and actuating means connected to the movable blade at opposite sides of its fulcrum.

In testimony whereof I affix my signature, in the presence of two witnesses.

WALTER WINFRED PARKER.

Witnesses:
 EDGAR V. MOORE,
 E. M. DINIUS.